G. F. J. COLBURN.
BIRD-CAGE.

No. 180,204. Patented July 25, 1876.

Witnesses:
E. J. Middleton Jr.
Thomas F. Sullivan

Inventor:
George F. J. Colburn

UNITED STATES PATENT OFFICE.

GEORGE F. J. COLBURN, OF WASHINGTON, DISTRICT OF COLUMBIA.

IMPROVEMENT IN BIRD-CAGES.

Specification forming part of Letters Patent No. 180,204, dated July 25, 1876; application filed June 19, 1876.

*To all whom it may concern:*

Be it known that I, GEORGE F. J. COLBURN, of the city of Washington, District of Columbia, have invented certain new and useful Improvements in Bird-Cages; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention consists in providing one or more sections of a bird-cage body with a band or frame of metal, or other material suitable for the purpose, so constructed as to have openings or spaces to be filled with a transparent medium, to admit light to the interior of the cage, so that the habits and movements of the bird can be seen, with intervening spaces between the openings provided with apertures for the admission of air, and for the reception of any ornamental devices or decorations it may be desirable to use. This portion may be provided with the necessary apertures for the attachment of the feed-cups and door, and admission and operation of the catch or fastening. I also furnish any upper portion of my cage or the perch with a mirror, having suitable means of attachment, for the entertainment or an aid to the instruction of the bird, which may also be used as an ornament to the cage.

I attach the body of the cage to a bottom of the usual construction by means of a spring-catch or fastening of a peculiar construction.

Having thus described the nature of my invention, I proceed to its construction and operation, reference being had to the drawings making part of this specification.

Figure 1:
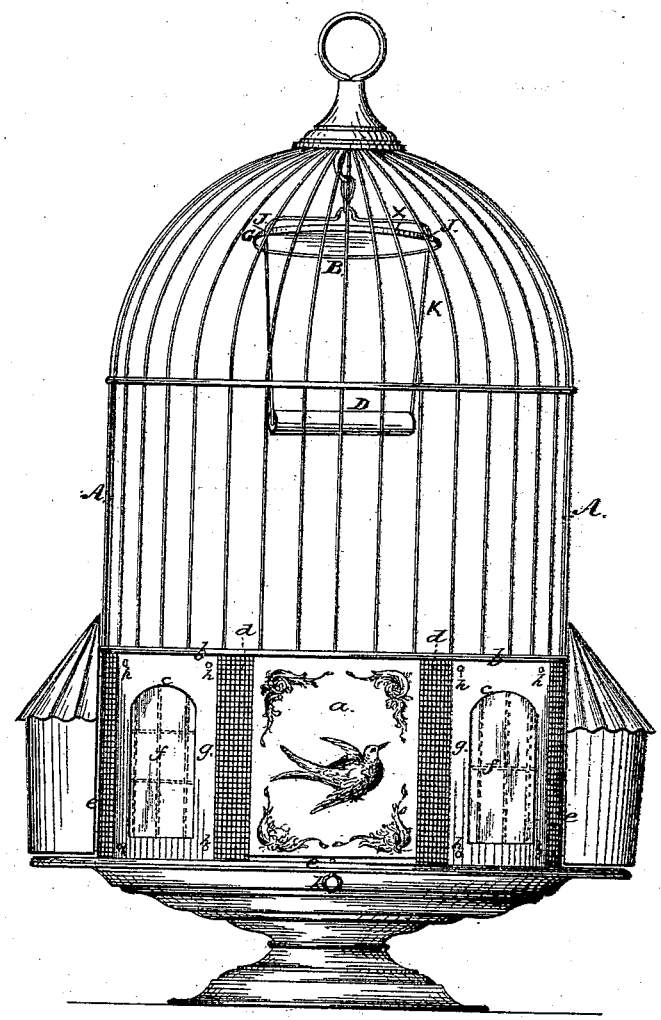
Figure 1:
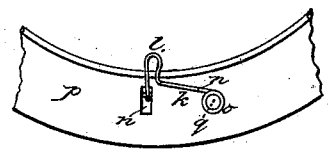
Figure 2:
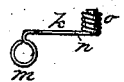

Letter A, Figure 1, is a view of my cage, constructed, in the usual manner, of wire or other material, except that the lower portion of the body is composed of a frame or band, *a*, of sheet metal, or other material adapted for the purpose. This band or frame I attach in a firm and secure manner to the wire portion of the body, as at *b*, so as to form an integral portion of the cage-body, or as an addition to cages already in use. From different portions of this frame or band, as at *c*, I remove a section of the material, to form openings for the admission of light to the interior, so that the habits and movements of the bird may be clearly seen. At other portions, either directly around these openings or in the intervening space between, I make small holes *d* to admit air. At other places, as at *e*, I remove a portion of the material to make openings for the door and feed-cups, and also to allow of the action of the catch or fastening that unites the body to the bottom of the cage. Immediately back of the openings *c* I attach one or more guard wires or strips, *f*, at such distances from each other as to prevent the bird escaping through the opening. These attachments may be a part of the cage-body or pieces attached to the orifices themselves. I cover the openings *c* with a transparent medium, as glass, or mica, or isinglass, the latter being an article best adapted for the purpose of being readily conformed to the portion to which it is desirable to apply it, and also being of the necessary transparency to admit light. This transparent material I attach to the said openings in some suitable manner, so as to be firmly secured and readily inserted and removed for cleansing when necessary. I find a frame, *g*, well adapted for this purpose. I attach this frame *g* to the band or frame *a* by rivets *h*, or in any other way desirable to properly secure it in position. For convenience this frame *g* may be hinged, so as to open for the more ready cleansing of the mica.

The lower portion of a bird cage being thus constructed renders a cage-body much stronger and more durable than if made wholly of wire, in the usual manner. It can be made quite ornamental by the use of the transparent material, and by being painted, or by the use of various ornamental devices, such as birds, flowers, &c., attached to the unoccupied surface.

B is a mirror, having a frame, G, as is usual. To adapt this mirror of any suitable form to be hung to a perch, a body, dome, or other elevated portion of a bird-cage, I have provided for it a suitable means of attachment to such parts of the cage. This consists of a wire, J, bent in the center, or between its ends, into a hook or eye, and fastened at either end to the frame G.

I have shown the perch attached to the mirror-frame G by its standards K. I would not confine myself strictly to the form or position of this hook and support and bearings, as its shape and position in regard to the frame G depends upon the place the mirror is to occupy when attached to the cage.

This mirror may be concave, convex, flat, or spherical. This mirror can be made not only an ornamental appendage to a bird-cage, but its use will serve to entertain the little songster and increase his inclination to sing.

I attach the body of my cage to a bottom, as usually constructed, by means of a spring-catch or fastening, $k$, made of sheet metal or wire, and of such a form that it will have a projection or lip, $l$, handle $m$, spring shank $n$, terminating in a coil-spring, $o$. (In a modification of this form of spring-catch a flattened end can be substituted for the coil, so constructed as to be riveted to the cage-bottom.) I attach this spring-catch to the inside of the outer rim of the cage-bottom, as at $p$, by fastening securely the coiled portion to a post or rivet, $q$, slotted and squared, or otherwise formed so as to be firmly attached to the cage-bottom by soldering, riveting, &c. The catch is operated by the handle $m$, which passes through a slot, $n$, cut in the cage-bottom for it to pass. This spring can be operated, if necessary, without a handle, as described, by acting the spring-shank from the upper side of the cage-bottom. This form of spring-catch is strong and safe, and is applicable to all cages in general use, and much less liable to be deranged and rendered inoperative than fastenings not spring-acting. It acts by the lip $l$ pressing firmly upon the lower ring or rim of the cage-body.

Having thus described the construction of my cage and its appurtenances, it will be seen that it differs from cages in general use, possessing new and valuable features, and constituting a cage much stronger in form and more susceptible of ornamentation than if constructed wholly of open wires, and is provided with a spring-fastening and other novelties not found in common use as attached to or making part of bird-cages as usually constructed.

I am aware that bird-cages have been constructed having a sub base or chamber made of blown glass and attached to the cage so as to be removable; also, that a metallic sub-chamber (also removable) with a metallic covering having a center orifice for the bird to enter, with no lateral provisions for light and air, has been made; also, that squirrel-cages have been made with permanent glass sides. Therefore I disclaim such constructions, and limit myself to my mode of admitting air and light in the construction of bird-cages. Although not limiting myself to the employment of a transparent medium, I prefer to use mica as such in the construction of my cages, believing it has never been used in such construction. This substance differs materially from glass, being of a different nature, though possessing similar properties of transparency. Mica, unlike glass, is flexible, so as to be bent and readily made to fit the place where it is to be used; being laminable, it can be used in much thinner pieces than glass.

Having described the nature of my invention and its construction, I claim—

1. A bird-cage provided with a band, $a$, of generally imperforate material, having glazed apertures $c$, provided with guards $f$ and frame $g$, with intervening spaces having perforations $d$, substantially as and for the purposes specified.

2. A bird-cage provided with a band or frame, $a$, of generally imperforate material, having glazed windows $c$, provided with guard-wires $f$ and frame $g$, air-openings $d$, and apertures for door and feed-cups, substantially as and for the purpose set forth.

3. In combination with a body, dome, or perch of a bird-cage, a mirror, B, constructed with a frame, G, combined with a hook or eye attachment or support, J, substantially as and for the purpose set forth.

4. A spring-catch or fastening, $k$, having a projection or lip, $l$, handle $m$, spring-shank $n$, spring-coil, $o$, attaching post or rivet $q$, constructed and applied in the manner and for the purpose specified.

In testimony that I claim the foregoing as my own invention I affix my signature in presence of two witnesses.

GEORGE F. J. COLBURN.

Witnesses:
E. J. MIDDLETON, Jr.,
THOMAS F. SULLIVAN.